Dec. 11, 1934.   J. GUALTIERE   1,983,851

MANUALLY OPERATED RIVET SETTER

Filed Dec. 27, 1933

INVENTOR
Julius Gualtiere
BY
Ramsey & Kent
his ATTORNEYS

Patented Dec. 11, 1934

1,983,851

UNITED STATES PATENT OFFICE 1,983,851

MANUALLY OPERATED RIVET SETTER

Julius Gualtiere, Brooklyn, N. Y., assignor to Edwin B. Stimpson Company, Brooklyn, N. Y., a corporation of New York Application December 27, 1933, Serial No. 704,090

7 Claims. (Cl. 218—1)

The present invention relates to hand operated tools and more especially to a snap fastener, rivet, or eyelet setting press.

The principal purpose of the present invention is to provide a hand press for setting snap fasteners, rivets, eyelets, or fasteners, which press may be operated quickly to produce a heavy pressure from relatively small manual effort and whereby the device is of sturdy construction so that it may withstand rough treatment due to rapid manual operation.

Another feature of the present invention is the arrangement of anti-friction members comprising a roller bearing and ball bearings on opposite sides of a cam member so that friction is minimized at the time the heaviest pressure is applied to the parts when the dies are in operation.

Figure 1:
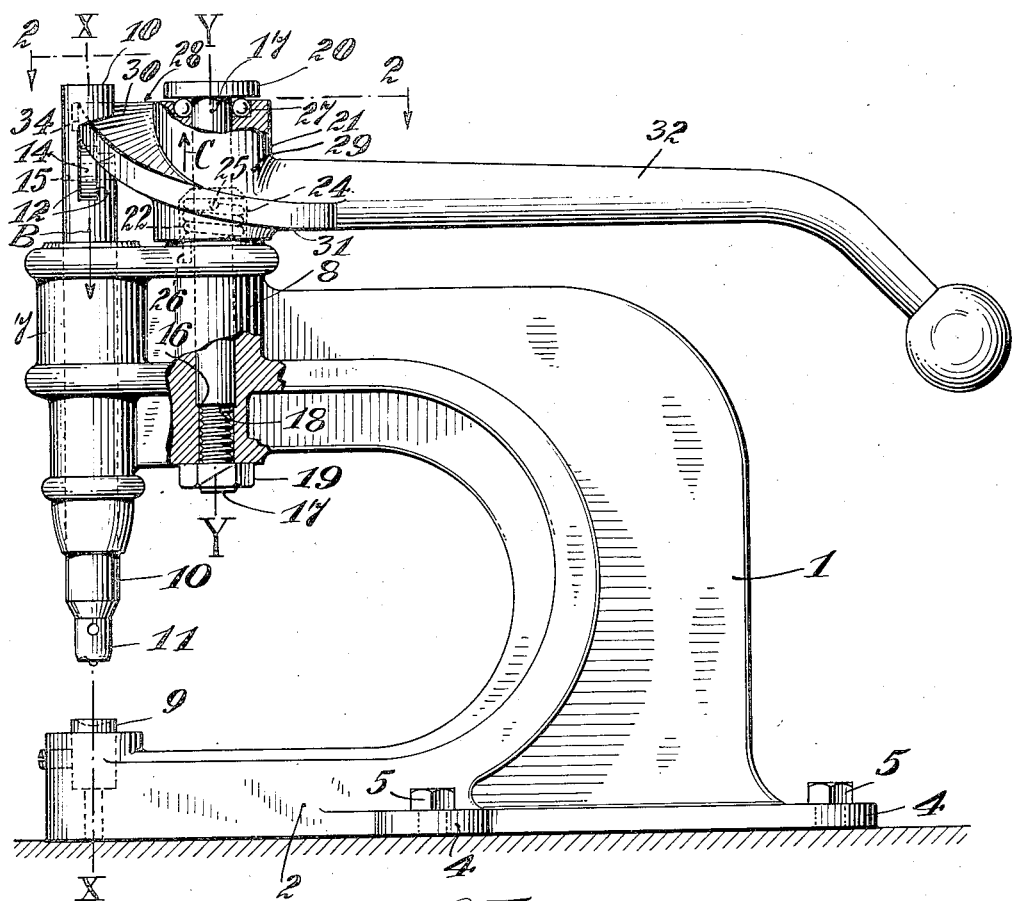
Fig. 1 is a side elevation of the device.

The apparatus comprises a frame 1 having a base 2 provided with wings 4 through which bolts or lag screws 5 may be used to attach the device to a bench or table. Extending upwardly from the base is a U-shaped web carrying bosses 7 and 8. The forward end of the base is recessed to receive an anvil die member 9. The boss 7 is provided with a vertical opening, the axis X—X of which includes the axis of the anvil die 9. A plunger 10 has a sliding fit with the opening in the boss 7 and this plunger carries at its lower end an operating die 11 adapted to cooperate with the anvil die 9 to perform the work for which the device is intended. Both dies 9 and 11 are removably mounted to permit the change of dies for different operations. The upper end of the plunger 10 is provided with a recess 12 beneath which is an anti-friction roll 14 mounted on a pivot 15.

Figure 2:
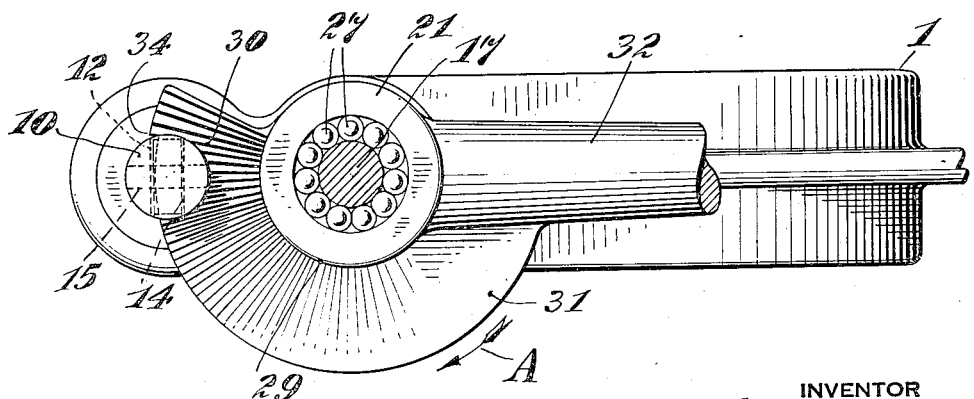
Fig. 2 is a top plan view of the front end of the device.

The boss 8 is provided with a cylindrical opening, the axis Y—Y of which is parallel to the axis X—X in the boss 7. This opening in the boss 8 is provided with a shoulder 16 adjacent its lower end. A bolt 17 extends through the opening in the boss 8 and this bolt is also provided with a shoulder 18 which is adapted to set on the shoulder 16 in the opening in the boss 8 of the frame of the device. The lower end of the pivot bolt 17 is screw threaded and carries a nut 19 which clamps the shoulder 18 on the bolt tightly against the shoulder 16 in the opening in the frame. The upper end of the pivot bolt 17 is provided with a head 20 having a smooth under surface. An operating member 21 is provided with an opening comprising a bearing adapted to rotate around the upper end of the pivot bolt 17. A coiled spring 22 is mounted in a recess 24 in the operating member and has one end 25 extending into an opening to anchor this end in the operating member, and the other end 26 extends into an opening in the frame 1 to anchor this end to the frame. The upper part of the operating member is recessed beneath the head 20 of the pivot bolt 17 to provide a raceway for the bearing balls 27 of the thrust ball bearing between the upper end of the operating member 21 and the head 20 of the pivot bolt. An operating cam 28 extending outwardly from the body 29 of the operating member extends into the recess 12 in the plunger 10 and above the anti-friction roll 14. This cam has a portion 30 of relatively sharp helical inclination and another portion 31 adjacent the terminal end of the cam 28 of lesser helical inclination. A handle 32 is attached to the body 29 of the operating member. A stop 34 is provided on the cam 28, which stop 34 is normally maintained in engagement with the side of the plunger 10, as is illustrated in Fig. 2, by the action of the coiled spring 22.

When the device is in operation, suitable dies 9 and 11 are set in the base 2 and in the plunger 10 and the work is placed between the dies. The operating handle 32 is pulled in the rotative direction to move the stop 34 away from the side of the plunger 10 and to cause the body 29 of the operating member to rotate around the pivot bolt 17 as an axis in the direction of the arrow A, Fig. 2. This rotation causes the cam 28 to bear against anti-friction roll 14 and move the plunger 10 downwardly. When the portion 30 of the cam 28 is in engagement with the anti-friction roll 14 on the plunger, the movement of the plunger downwardly is a relatively rapid movement, but as the operating die 11 approaches the anvil die 9, the portion 31 of the cam 28 becomes in engagement with the anti-friction roll 14 and the movement of the plunger downwardly is less rapid for the same angularity of motion given to the operating handle. This arrangement permits of the application of heavy pressure between the operating die and the anvil die to be developed from a relatively small effort through a larger angle of movement of the outer end of the handle 32. This closing of the dies, therefore, permits the rigid setting of snap fasteners, rivets, or eyelets, or the like without undue application of strength by the operator. After the operation is completed, the operator may release the handle 32 and it will be swung backward to its original position by the energy stored in the coil spring 22. This spring 22 rotates the body 29 of the operating member until the stop 34 engages the side of the plunger 10 and a cycle of operations has been completed. It will be noted that the device is constructed in such manner that when a heavy pressure is applied between the operating die and the anvil die, this pressure is applied through the cam 28 to the anti-friction roll 14 in the direction of the arrow B, and the force is resisted by the bearing rolls 27 under pivot bolt head 20 with the force being applied in the direction of the arrow C. It, therefore, will be noted that during the working part of the cycle, anti-friction bearings carry the load since these bearings are provided on opposite ends of the thrust zone, namely, the anti-friction roll 14 taking up the thrust in a downward direction and the bearing balls 27 comprising the abutment which takes the thrust in the upward direction. This arrangement of anti-friction bearings greatly facilitates the ease of operation of the machine.

Having described my invention, what I claim is:

1. A manually operated rivet setter comprising a U-shaped frame, a pair of vertical bosses at the forward end of the upper arm of the frame, an anvil on the forward end of the other arm of said frame, a vertically extending pivot bolt mounted in one of said bosses, a slideable plunger in the other of said bosses and vertically movable over said anvil; a hand operated member rotatable in a horizontal plane on said pivot shaft, a cam on said member in operative connection with the plunger to force the plunger toward said anvil when said arm is swung in one direction.

2. A hand operated rivet setter comprising a U-shaped frame with a bearing in the front portion of said frame, a plunger vertically movable in said bearing, an anvil on the lower arm of said frame and mounted directly beneath said plunger, a hand operated cam cooperating with said plunger to force said plunger downward toward said anvil when said cam is moved in one direction, a vertical bearing stud for said cam, said cam being provided with a steep inclination at the starting end of the cam and a flat inclination at the other end of the cam, a stop for stopping the movement of said cam in one direction when the plunger is raised, and a spring acting directly on said cam to normally maintain said stop seated to hold said plunger in the raised position.

3. A manually operated rivet setter comprising a U-shaped frame, a plunger mounted to reciprocate in a bearing in the forward end of said U-shaped frame, an anvil mounted directly beneath the path of movement of said plunger, an operating handle mounted to swing in a horizontal plane on a vertical axis, a wing cam connected with said operating handle and cooperating with said plunger, and a spring operative directly on said handle to return said handle to normal position, said wing cam having an initial portion of a steep inclination and a terminal portion of a flat inclination, said spring being operative to retain said cam in position to hold said plunger raised.

4. A manually operative rivet setter comprising a frame having a pair of arms, an operating plunger mounted at the forward end of one of said arms, an anvil mounted at the forward end of the other of said arms and directly beneath said plunger, a bearing member rotatably mounted on said frame, a wing cam on one side of said bearing member, a handle connected to said bearing member, an anti-friction roller carried by said plunger and in contact with the under side of said cam, and an anti-friction bearing mounted on the top end of said bearing member whereby the thrust forces produced by said cam are supported in one direction upon said anti-friction roll and are supported in the other direction by said anti-friction bearings.

5. A manually operated rivet setter comprising a frame, a plunger mounted to reciprocate in said frame, an anvil mounted on said frame in the path of said plunger, an operating cam for said plunger, a vertical bearing stud for said cam, said cam having a steep inclination adjacent its initial portion and a flat inclination adjacent its terminal portion, and manual means operative in a horizontal plane for operating said cam to force said plunger toward said anvil.

6. A manually operated rivet setter comprising a frame, a reciprocating plunger mounted on said frame, an anvil with which said plunger is adapted to cooperate to set rivets, a cam member adapted to move said plunger toward and from said anvil, an anti-friction roller on said plunger in engagement with said cam, manual means to operate said cam, and a coiled torsion spring operative directly on said cam to normally hold said cam in position to raise said plunger, said cam having a steep inclination at the starting end of the cam and a flat inclination at the other end of the cam whereby said plunger is moved rapidly during the initial movement of said cam and is moved more slowly as the plunger approaches the anvil.

7. A manually operated rivet setter comprising a frame, a plunger mounted to reciprocate in said frame, an operating die carried by the lower end of said plunger, an anvil die mounted on said frame directly in line of movement of said plunger, a stub shaft mounted on said frame, said stub shaft having a bearing head on the upper end thereof, a bearing member rotatably mounted on said stub shaft beneath said bearing head, a ball bearing between said head and the upper end of said bearing member, said bearing member being provided with a recess, a coil spring seated in said recess and encircling said stub shaft with one end of said coiled spring being anchored to said frame and the other end of said coiled spring being anchored to said bearing member, a wing cam mounted on said bearing member and cooperating with said plunger, and means whereby said bearing member may be rotated in opposition to the energy expended by said spring to force said plunger toward said anvil.

JULIUS GUALTIERE.